United States Patent [19]

Alfano et al.

[11] Patent Number: 4,932,031
[45] Date of Patent: Jun. 5, 1990

[54] CHROMIUM-DOPED FORESTERITE LASER SYSTEM

[76] Inventors: Robert R. Alfano, 3777 Independence Ave., Bronx, N.Y. 01463; Vladimir Petricevic, 547 Riverside Dr., New York, N.Y. 10027; Swapan Gayen, 2112 Starting Ave., Apt. No. 6D, Bronx, N.Y. 10462

[21] Appl. No.: 248,749
[22] Filed: Sep. 26, 1989

Related U.S. Application Data

[63] Continuation-in-part of Ser. No. 128,811, Dec. 4, 1987.
[51] Int. Cl.$^5$ ............................................. H01S 3/16
[52] U.S. Cl. ......................................... 372/41; 372/18; 372/20; 372/69; 372/94; 372/13
[58] Field of Search .................... 372/10, 18, 41, 94, 372/13, 20, 69

[56] References Cited

FOREIGN PATENT DOCUMENTS 240692A 10/1986 Japan .
62573A 3/1987 Japan .

Primary Examiner—Léon Scott, Jr.
Attorney, Agent, or Firm—Irving M. Kriegsman

[57] ABSTRACT

A laser system in which the laser medium is a single crystal of $Cr_{3+}:Mg_2SiO_4$ is disclosed. In one embodiment, the system comprises a single crystal of chromium doped forsterite and a cavity which includes a pair of 30 cm. radius mirror having high transmission at 543 nm (the pump wavelength) and high reflectivity in the 1150–1350 nm range. Room temperature vibronic pulsed laser action is obtained with this cavity. Laser action has been observed at 1235 nm and a bandwidth of 25 nm. The wavelength range is suitable for transmission through optical fibers and is useful in laser ranging and remote sensing. Because of the ultrawide fluorescence bandwidth and a 15 fluoroescence lifetime the system is suitable for high intensity, tunable, cw, Q switched mode locked operation. In the mode locked operation pulses as short as 10–500 femtosecond may be generated. A number of different embodiments of the invention are described.

32 Claims, 5 Drawing Sheets

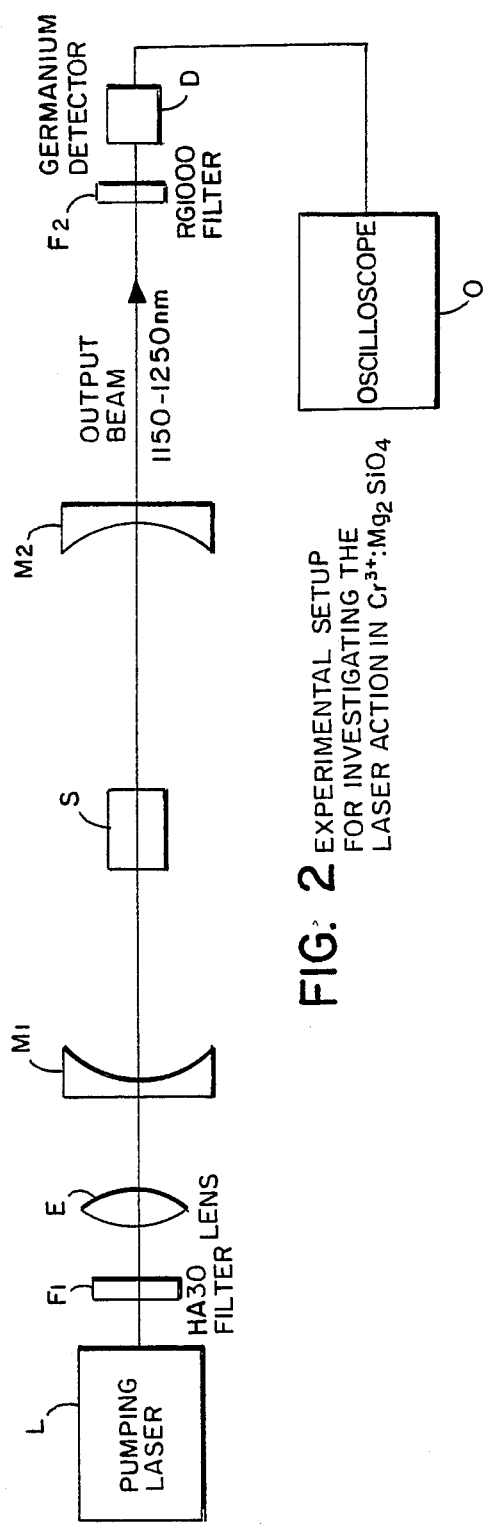
FIG. 2 EXPERIMENTAL SETUP FOR INVESTIGATING THE LASER ACTION IN $Cr^{3+}:Mg_2SiO_4$
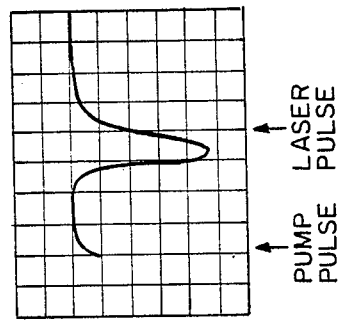
FIG. 3 TEMPORAL PROFILE OF THE $Cr^{3+}:Mg_2SiO_4$ LASER PULSE (Q-SWITCH MODE LOCKED CAVITY)

(Q-SWITCH MODE LOCKED CAVITY)

RING CAVITY
(Q-SWITCH MODE LOCKED)

CHROMIUM-DOPED FORESTERITE LASER SYSTEM

CROSS-REFERENCE TO RELATED APPLICATION

This application is a continuation-in-part of U.S. patent application Ser. No. 128,811 filed on Dec. 4, 1987 in the names of Robert R. Alfano, Vladimir Petricevic and Swapan K. Gayen.

BACKGROUND OF THE INVENTION

The present invention relates generally to lasers and more particularly to a laser in which the laser medium is a single crystal of chromium-doped magnesium orthosilicate forsterite ($Cr:Mg_2SiO_4$).

The use of lasers in science and industry has received wide acceptance in an ever increasing variety of applications. Lasers have found use in such diverse areas as range finding apparatus, optical surgery, optical printers, optical readers and metal drilling. Briefly, lasers operate on the principle of light amplification through stimulated emission of radiation and can create extremely intense concentrations of light. The coherent light beam produced in a laser cavity is amplified in a laser material. Materials which have been used as laser media include gases, liquids, glasses and single crystalline solids.

When single crystalline solids are utilized in lasers, the crystals are generally in the form of elongated rods. The structure of the crystalline material must be very nearly perfect, since any optical inhomogeneities will cause distortion and scattering of the laser beam and thereby reduce the intensity and coherence of the radiation. Imperfections in the crystal which adversely affect lasing performance include elastic strain, crystal misorientations, chemical concentration inhomogeneities, dislocations, inclusions and bubbles.

In U.S. Pat. No. 3,997,853 to R. C. Morris et al. there is disclosed a laser in which the host comprises a single crystal of beryllium aluminate ($BeAl_2O_4$) doped with trivalent chromium ions, the single crystal being crystallographically oriented substantially along the a-c plane, at least 30 degrees removed from the b-axis, and having a chromium doping concentration ranging from about 0.005 to 1.0 atom percent.

In U.S. Pat. No. 4,272,733 to J. C. Walling et al., there is disclosed a high power, broadly wavelength-tunable laser system which comprises as the laser medium particular single crystals of chromium-doped beryllium aluminate ($BeAl_2O_4:Cr^{3+}$) having the chrysoberyl structure, means for exciting the laser medium and tuning means. The laser may be operated over a broad temperature range from cryogenic temperatures to elevated temperatures. Elevated temperatures are preferred, however, since they result in higher laser gain. Emission is in a spectral range from red to infrared, and the laser is useful in the fields of defense, communications, isotope separation, photochemistry, etc.

In U.S. Pat. No. 4,019,156 to W. D. Fountain there is disclosed a Q-switched/mode-locked Nd:YAG laser oscillator employing simultaneous active (electro-optic) and passive (saturable absorber) loss modulation within the optical cavity. This "dual modulation" oscillator can produce transform-limited pulses of duration ranging from about 30 psec to about 5 nsec with greatly improved stability compared to other mode locked systems. The pulses produced by this system lack intrapulse frequency or amplitude modulation, and hence are ideally suited for amplification to high energies and for other applications where well-defined pulses are required. Also, the pulses of this system have excellent interpulse characteristics, wherein the optical noise between the individual pulses of the pulse train has a power level well below the power of the peak pulse of the train In U.S. Pat. No. 4,464,761 to R. R. Alfano, et al. a laser system in which the laser medium is a single crystal of $Be_3A_2(SiO_3)_6:Cr^3$ (Emerald) is disclosed. Because of its wide fluorescence bandwidth, the material is suitable for high intensity, tunable, mode-locked pulses with durations as short as 10–500 femtoseconds. A number of different laser systems containing this laser medium are described.

In an article entitled Color by Kurt Nassau appearing in Scientific America, Oct. 1980. Volume 243, Number 4, pp. 124–156, various properties of Ruby, alexandrite and Emerald are discussed.

SUMMARY OF THE INVENTION

It is an object of this invention to provide a new and improved laser.

It is another object of this invention to provide a new and improved laser material.

It is still another object of this invention to provide a new and improved chromium doped laser material.

It is yet still another object of this invention to provide a new and improved solid state laser which can be broadly tuned and which can produce short pulses having durations in the picosecond and femtosecond range.

According to the teachings of the present invention there is provided a laser which comprises a laser medium in the form of a single crystal of forsterite doped with divalent, trivalent or tetravalent chromium ions, means for exciting said laser medium to emit coherent radiation, and an optical resonant cavity for supporting coherent radiation emitted by the laser medium.

According to one feature of the invention the laser may include tuning means within the optical resonant cavity for tuning the laser over a range of frequencies and according to another feature of the invention the laser may include mode locking means for producing mode locking operation. The laser material may be made either in a rod type or a disc type configuration. The chromium doping is in the range of about 0.01 to 0.5 atom percent.

A number of different laser system configurations employing the novel laser material are disclosed.

For a better understanding of the present invention, together with other said further objects thereof, reference is made to the following description taken in conjunction with the accompanying drawings and its scope will be pointed out in the appended claims.

BRIEF DESCRIPTION OF THE DRAWINGS

In the drawings wherein like reference characters represent like parts:

FIG. 2 is a schematic illustration of an experimental system used in investigating laser action in $Cr:Mg_2SiO_4$;

FIG. 3 is a graph of the temporal profile of a laser pulse;

DETAILED DESCRIPTION OF PREFERRED EMBODIMENTS

Figure 1A:
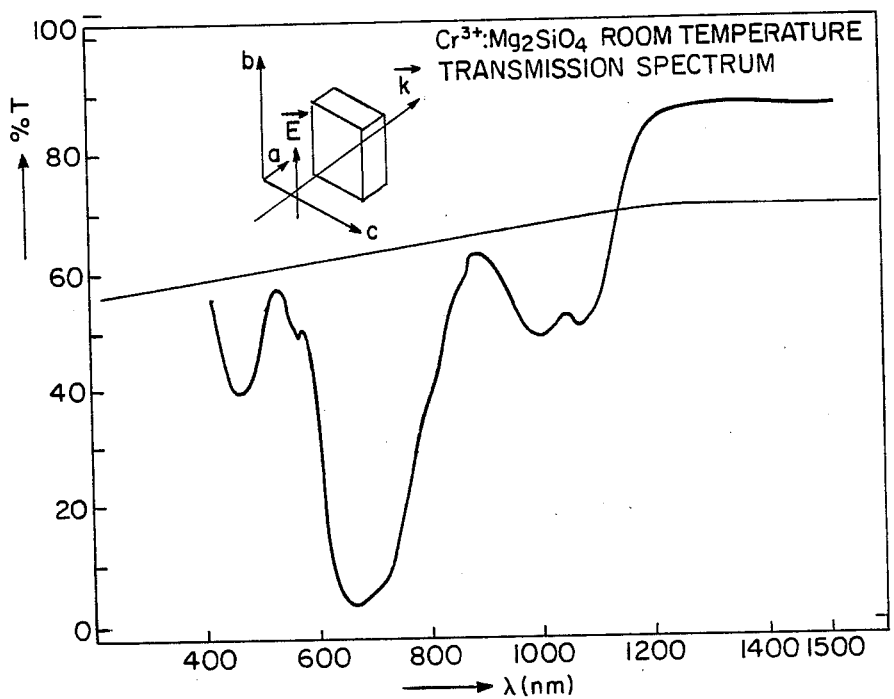
FIGS. 1(a) and 1(b) are graphs of the room temperature transmission and fluorescence spectra, respectively of, $CR:Mg_2SiO_4$.

The present invention is based on the discovery that chromium doped forsterite, i.e. chromium doped magnesium orthosilicate, might work as a laser medium for a tunable solid state laser and more specifically that chromium doped forsterite lases.

In experiments conducted, the emission spectra of a chromium doped forsterite laser system were taken with a 500 nm blazed-grating spectrometer and a S-1 photomultiplier tube having sensitivity up to 1000 nm and with a cavity designed to obtain laser operation in the 700-1000 nm spectral region revealed no laser action because of residual absorption due to impurity ions in the crystal used that extends from 850 to 1150 nm.

However, when fluorescence spectra were subsequently taken with a spectrometer equipped with a 1000 nm blazed grating and a germanium-photodiode combination the spectral range expanded to 700-1350 nm., showing the possibility of laser action in the 1150-1350 nm spectral range. Using ordered high-reflectivity mirrors for the spectral range 150-1350 nm, and high transmission at 532-nm for a pump laser, a stable cavity was designed with those mirrors, and pulsed laser action was readily obtained with longitudinal pumping of the crystal using the 532 nm, 10 ns pulses from a Q-switched Nd: YAG laser.

Prompted by the successful broadly wavelength-tunable, room-temperature operation of alexandrite and emerald lasers, the surge in research activities on tunable solid state lasers has been extensive in the eighties. The thrust of these research endeavors has been two fold: first to look for new host materials for the trivalent chromium ion, and second, to search for new ions that will lase in commonly used host crystals. These efforts have been rewarded by the successful wavelength-tunable laser operation of $Cr^{3+}$ in a number of hosts, by the discovery of the new lasing ions trivalent titanium ($Ti^{3+}$) and divalent rhodium ($Rh^{2+}$) as well as by the "rediscovery" of tunable phonon-terminated lasers based on divalent transition metal ions $Ni^{2+}$, $CO^{2+}$ and $V^{2+}$. The present invention is directed to the first room-temperature vibronic, pulsed laser operation of Cr in forsterite ($Mg_2SiO_4$).

Forsterite, like alexandrite, is a member of the olivine family of crystals. It is a naturally occurring gem. Single crystals of forsterite may be grown by the Czochralski method. A unit cell of forsterite has four formula units in an orthorhombic structure of the space group Pbnm. the unit cell dimensions are: a=4.76å, b=10.22å, and C=4.99å. The $Cr^{3+}$ion substitutes for the $Mg^{2+}$ion in two distinct octapedrally co-ordinated sites: one (M1) with inversion sysnmetry ($C_i$), and the other (M2) with mirror symmetry ($C_s$). The occupation ratio of the two sites by the $Cr^{3+}$ion is M1: M2 =3:2.

A single crystal of $Cr:Mg_2SiO_4$ used for spectroscopic and laser action measurements was grown by the Czochralski method. The crystal was a 9 mm ×9 mm ×4.5 mm rectangular parallelepiped with the three mutually orthogonal axes oriented along the a, b and c crystallographic axes of the crystal. The crystal contained 0.04 at % of $Cr^{3+}$ions, which is equivalent to a chromium ion concentration of $6.9 \times 10^{18}$ ions/cm³.

Figure 1B:
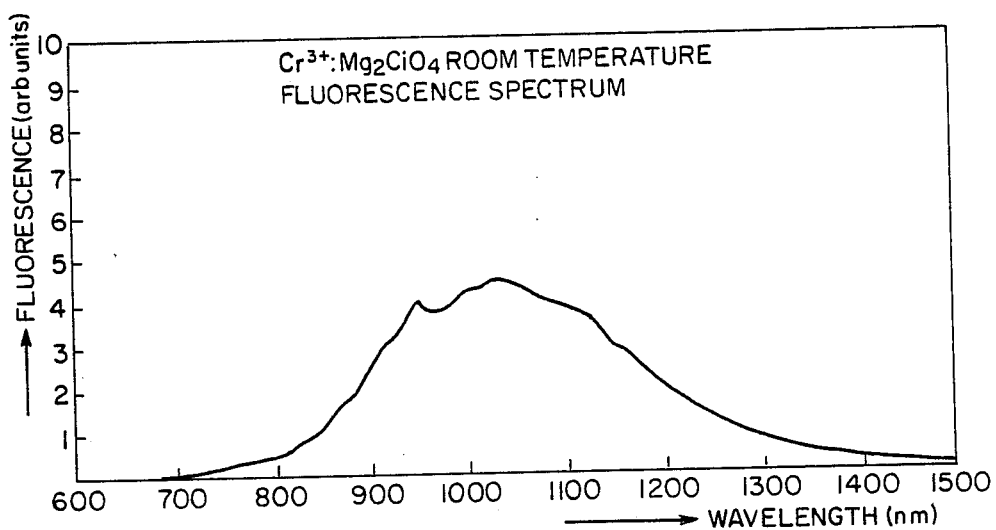

The room-temperature absorption and fluorescence spectra of $Cr:Mg_2SiO_4$ for E ∥ b crystallographic axis are shown in FIGS. 1(a) and 1(b). The absorption spectrum was taken with a Perkin-Elmer Lambda-9 spectrophotometer along the 4.5 mm path length of the sample. It is characterized by two broad bands centered at 740 nanometers (nm) and 460 nm attributed to the $^4A_2 \rightarrow ^4T_2$ and $^4A_2 \rightarrow ^4T_1$, absorptive transitions, respectively, of the $Cr^{3+}$ion. The shape and strength of the absorption spectra do not change significantly at liquid nitrogen temperature, except for the appearance of a sharp line at 702 nm and three lines between 540-575 nm. The line at 702 nm shows up as a prominent feature in the fluorescence spectra. This latter feature attributed to the $^4A_2 \rightarrow ^2E$ transition of the $Cr^{3+}$. The weak sharp lines between 540-575 nm are assigned to spin-forbidden $^4A^2 \rightarrow ^2T_2$ transitions. The broad, weak absorption band between 850-1150 nm is not observed in the excitation spectrum. This indicates that the origin of this absorption is not transitions in $Cr^{3+}$ion, but in some other center. It is evident from FIG. 1 that this background absorption overlaps a significant spectral region of emission, and inhibits laser action in that region.

The fluorescence spectrum of $Cr^{3+}: Mg_2SiO_4$ was excited by the 488 nm radiation from an argon-ion laser and recorded by a germanium photodiode detector-locking amplifier combination at the end of 0.25 -m monochromator (SPEX minimate) equipped with a 1000-nm blazed grating. The room temperature spectrum is a board band covering the wavelength range 700-1400 nm. At liquid nitrogen temperature, the spectrum shows the sharp $^2E \rightarrow ^4T_2$ zero-phonon line, followed by an elaborately structured sideband extending up to 750 nm. and a broadband peaked at 980 nm. The broadband is due to transitions from the $^4T_2$ state to the vibrational levels of the $^4A_2$ ground state, and almost the entire fluorescence is channeled into this band. The room temperature fluorescence lifetime is 15 s.

Both the absorption and emission spectra of $Cr:Mg_2SiO_4$ system depend strongly on the polarization of the incident light and the orientation of the crystallographic axes in the sample. This polarization dependence may be explained in terms of the reduction in Cr site symmetry $O_n \rightarrow D_2$ and associated polarization selection rules.

The experimental arrangement for investigating the laser action in $Cr:Mg_2SiO_4$ is shown schematically in FIG. 2. The chromium-doped forsterite sample S is placed at the center of a stable resonator formed by two 30-cm radius mirrors $M_1$ and $M_2$ placed 20 cm apart. Mirrors $M_1$ and $M_2$ were dielectric coated to transmit the 532-nm pump beam, and to have high reflectivity in the 1150-1350 nm spectral range. The reflectivity of the back mirror $M_1$ is 99.9%, while that of the output mirror $M_2$ is 98% for normal incidence over the specified wavelength range. It is to be noted that this spectral region does not correspond to the peak of the fluorescence spectrum, but was chosen so that the background absorption is minimal. The sample S was longitudinally pumped by frequency doubled 532-nm. 10-ns FWHM pulses from a Q-switched Nd:YAG laser (Quanda Ray DCR-1) L operating at a 10 HZ repetition rate. The spatial profile of the pump pulse was a doughnut, characteristic of an unstable cavity. The pump beam which was linearly polarized along the b crystallographic axis of the sample S was filtered by a filter $F_1$ and then focussed 3 cm before the sample S by a 25-cm-focal length lens E. The radius of the pump beam at the center of the sample S is $\sim 600$ $\mu$m. The output for the laser cavity was filtered by a filter $F_2$ and monitored by a germanium photodiode detector D. The output of detector D was displayed on a fast oscilloscope O. No dispersive element was placed in the cavity and the laser operated in a free running mode.

Pulsed laser operation has also been obtained for pumping at or above the lasing threshold of 2.2 mJ. A single output laser pulse was obtained, implying a gain-switched operation which is a consequence of pump-pulse duration being shorter than the lasing-level lifetime. The amplitude and duration of the laser pulse varied as expected with the pulse-to-pulse energy fluctuation of the pump laser. The output was extremely sensitive even to a small misalignment of the cavity, or insertion of a glass plate (8% loss) in the cavity.

The temporal profile of the $Cr:Mg_2SiO_4$ laser pulse is shown in FIG. 3. The temporal duration (FWHM) of the output laser pulse varied from 200 ns at the threshold to 100 ns at 2.4 times the threshold energy.

The delay between the peak of the pump pulse and the peak of the $Cr:Mg_2SiO_4$ laser pulse also varied, as expected, with pump-pulse energy, from 700 ns at the threshold to 200 ns at 2.4 times the threshold energy. This indicates that the laser cavity is highly lossy, and several hundred round trips are required to build up laser oscillation in the cavity.

Figure 4:
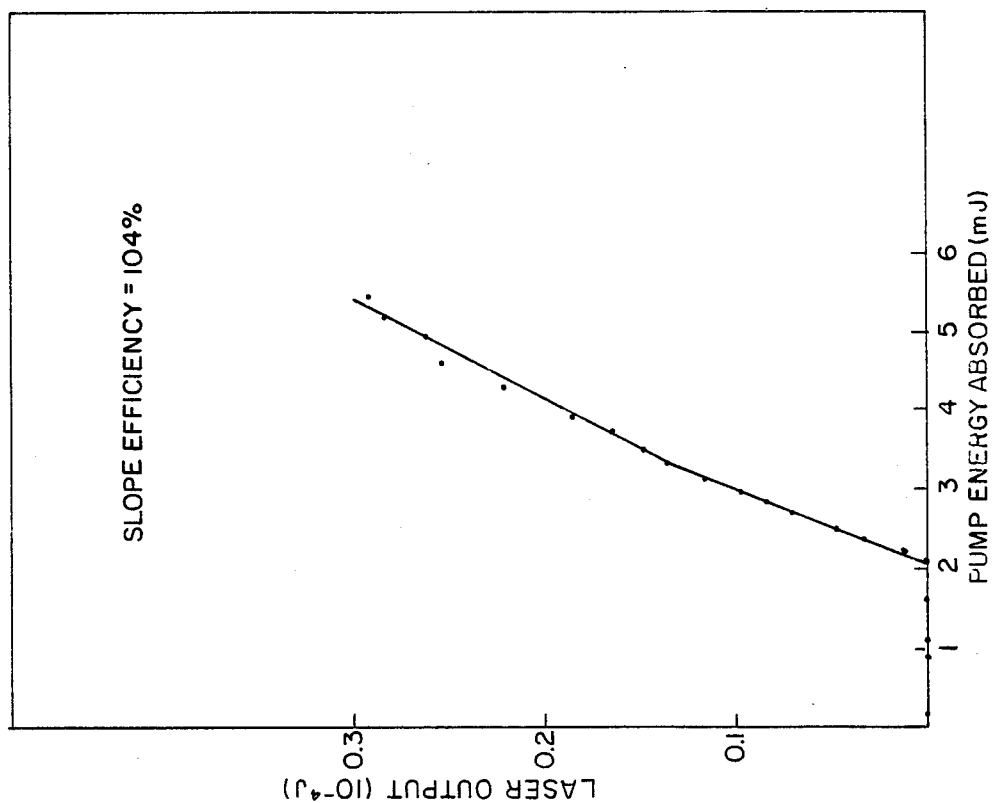
FIG. 4 is a graph of the slope efficiency for the cavity shown in FIG. 2.

The laser slope efficiency was measured for the cavity used in the above noted experiment and the data is displayed in FIG. 4. The laser oscillation starts to build up at an absorbed input energy of 2.2 mJ. The measured slope efficiency of 1.4% is rather low, and indicates large losses in the cavity. These losses include 13% reflection loss from the uncoated sample surfaces, scattering from inhomogeneties in the crystal, and a large mismatch between the size, of the pump beam and the $Cr:Mg_2SiO_4$ cavity modes in the sample.

Figure 5:
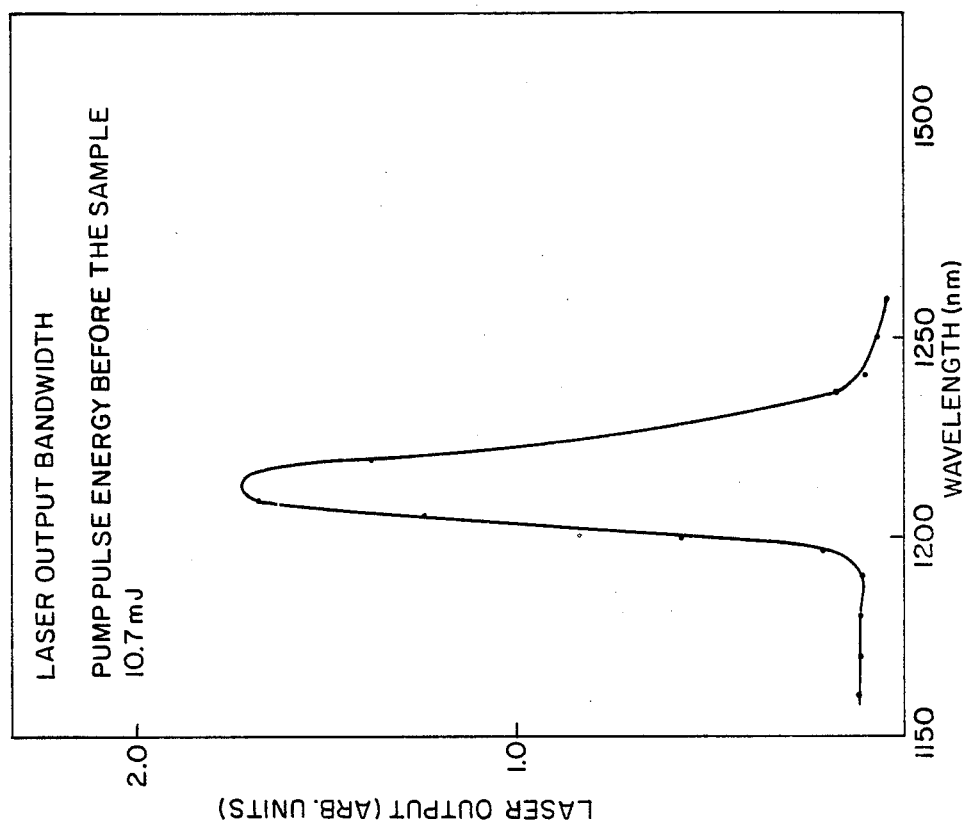
FIG. 5 is a graph of the output spectrum for the laser system shown in FIG. 2.

The spectrum of $Cr:Mg_2SiO_4$ laser is shown in FIG. 5, for an absorbed pump energy of 3.6 mJ. The spectrum peaks at 1235 nm and has a RWHM of 25 nm. The bandwidth of the laser output varies with absorbed pump energy. However, the spectral range is limited on the high energy end by the mirror transmission and the impurity absorption, while the low energy end by the mirror transmission as well as by the decrease in fluorescence intensity. Laser action has been observed in a narrow spectral range at the low-energy end, of $Cr:Mg_2SiO_4$ fluorescence band. Improvements in crystal growth technique may eliminate the impurity absorption that inhibits laser action in most of fluorescence band. With better crystals a tuning range of 800-1400 nm for the $Cr:Mg_2SiO_4$ laser can be expected.

Figure 6:
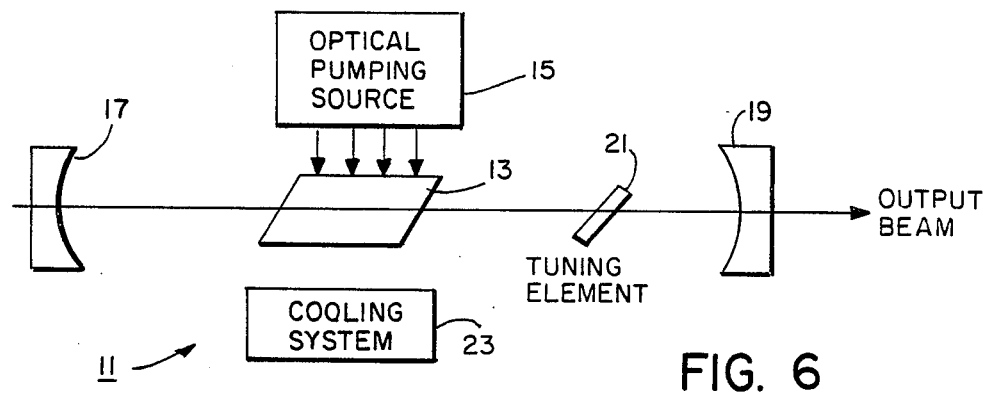
FIG. 6 is a schematic illustration of a tunable laser system constructed according to the present invention.

Referring now to FIG. 6, there is illustrated an example of a laser system constructed according to the teachings of the present invention and identified generally by reference numeral 11. Laser system 11 includes a laser medium 13, an optical pumping source 15, an optical resonant cavity made up of a 99.9% (i.e. fully) reflective curved end mirror 17 and a 50 to 99% reflective (partly transmissive) curved end mirror 19, a tuning element 21 located between laser medium 13 and end mirror 19 and a cooling system 23 for regulating the temperature of the laser rod 13, the cooling system 23 being illustrated for simplicity in block diagram form. Laser medium 13 consists of a single crystal of chromium doped forsterite ($Cr:Mg_2SiO_4$) with the chromium doping being in the range of about 0.01 to 0.5 atom percent. The crystal is constructed in the form of an elongated rod which is made longitudinal about the c-axis of the crystal. The ends of rod 13 may be cut at a Brewster angle, flat or 6-degree angle and may be coated with a suitable dielectric antireflection coating. Typical dimensions for rod 13 may be 1 cm. by 4 cm. The crystal may be conventionally grown by the Czochralski process, pumping source 15 may be any suitable optical pumping source, either incoherent or coherent, continuous wave or pulsed, that will excite the laser medium 13. If a coherent pumping source is used it must have an emission wavelength that is absorbed by the ground state of the Cr dopant but not absorbed excessively by the excited site. For example, pumping source 15 may be a xenon lamp or an argon or a diode laser. If pumping source 15 is a laser two configurations are possible, namely, (a) pump beam is perpendicular to the cavity axis (transverse pumping), and (b) pump beam is collinear with the cavity axis (longitudinal pumping). End mirror 17 contains a coating designed for maximum reflectivity over a band width between around 1150-1350 nanometers. End mirror 19 is curved and contains a similar coating designed for maximum reflectivity over the same bandwidth as end mirror 17. The 1150-1350 nm bandwidth covers the range of frequencies over which coherent light is produced.

If pumping source 15 is a laser and positioned outside the cavity along the axis of the cavity, the end mirror through which the pumping light passes into the cavity is designed for maximum transmissivity at the pumping laser emission frequency i.e. 532 nm (and/or 1064 nm) if it is a Nd:YAG laser. End mirrors 17 and 19 are spaced apart from one another by the proper distance to form an optically resonant cavity and rod 13 is located along the focal point of the end mirrors. End mirrors 17 and 19 may have a radius of curvature of around 30 centimeters. The output radiation, of laser system 11 shown by arrow 25 emanates from end mirror 19. If desired, both mirrors may be made partially reflecting. Cooling system 23 includes a fluid (not shown) which may be air, water or a cryogenic liquid, contained in a tank in communication with a laser mounting head (not show) through pipes. Tuning element 21 may be in the form of a prism a grating or a birefringent plate. Laser 11 operates in a conventional manner (as any solid state laser) and emits radiation over frequency band centered at 1235 nm with a bandwidth of 25 nanometers.

Figure 7:
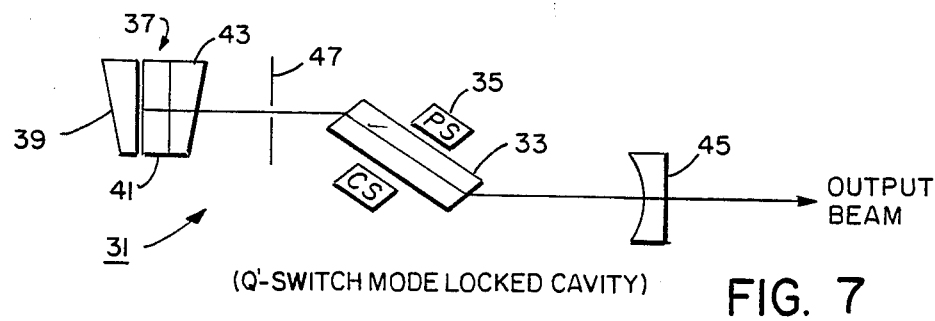
FIG. 7 is a schematic illustration of another laser system constructed according to the present invention.

Referring now to FIG. 7, there is illustrated a passively mode locked laser system 31 constructed according to the teachings of the present invention and identified generally by reference numeral 31. Laser system 31 includes a laser medium 33, a pumping source 35, an end assembly 37 having an end mirror 39, a dye cell 41 containing a saturable absorber and a window 43, an end mirror 45, an aperture plate 47 and a cooling system 49.

Laser medium 33 is similar to rod 13 with the exceptions being that the ends are cut at Brewster's angle and arranged for polarization along the b-axis and the rod itself aligned along the Brewster's angle rather than being collinear with axis of the cavity. The width of dye cell 41 may be around 100 microns to 2 millimeters. The dye cell 41 contains a saturable dye absorber (i.e. a saturable dye solution) which serves as a passive mode locking mechanism. The dye absorber is preferably an IR saturable cyananine dye. Examples of saturable cyananine dyes are S301, S401 and S501 in a solvent such as 1.3 dichloroethane. (Polland et. al., applied Physics B, 32, 53 (1983).) Pumping source 35, end mirror 39, end mirror 45, aperture plate 47 and cooling system 49 are the same as the corresponding elements 15, 17, 19, 21 and 23, respectively, in laser system 11.

In FIG. 3 there is illustrated another embodiment of a mode locked laser system identified by reference numeral 51. Laser system 51 is similar to laser system 31, the differences being that window 43 is omitted, an acoustic modulator 41 is positioned between end mirror 57 and laser rod 33 is oriented at about Brewsters angle and has thickness of about ½ to 1 cm. and diameter about 5 cm., the 99.9% reflecting end mirror 57 is curved with 1 to 10 meter radius of curvature rather than flat and the 50% to 98% output mirror 59 is correspondingly flat and wedge shaped rather than curved. Alternately, mirror 57 may be made flat and mirror 59 made to be curved. Alternately, mirror 57 may be made flat and mirror 59 made to be curved.

Figure 9:
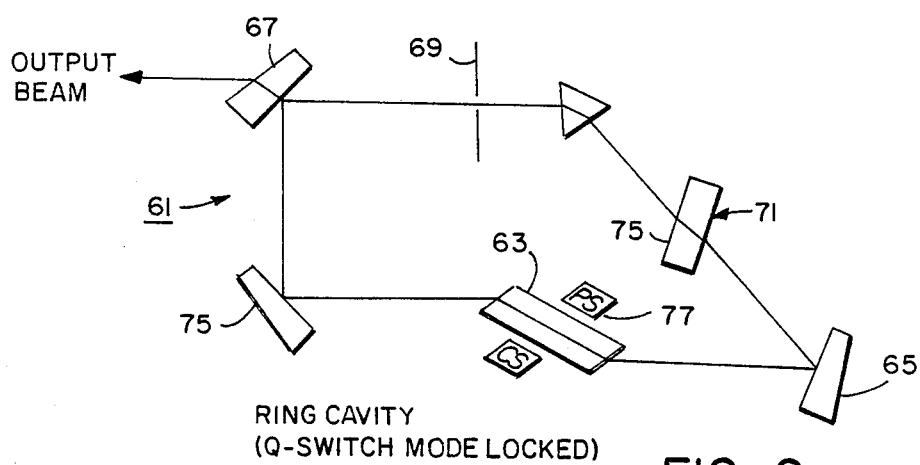
FIG. 9 is a schematic illustration of another laser system constructed according to the present invention.

In FIG. 9 there is illustrated another embodiment of a mode locked laser system 61 of the present invention in which the laser material 63 is located inside a ring type cavity such as used in a Ruby laser and wherein the output beam is tuned.

Figure 8:
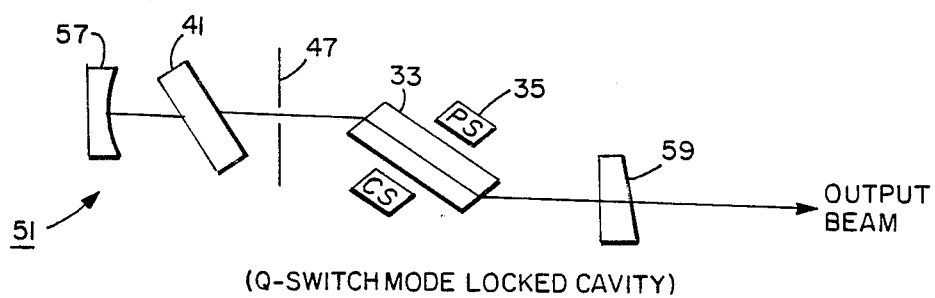
FIG. 8 is a schematic illustration of another laser system constructed according to the present invention.

Laser system 61 includes a laser rod 63 a flat wedge shaped 99.9% reflecting mirror 65, a flat 50% to 98% reflecting wedge shaped mirror 67, an aperture plate 69, tuning means 71 in the form of a prism, a cell or jet stream 73 containing a saturable dye absorber such as DDI and another flat 99.9% reflecting wedge shaped mirror 75 and an optical pumping device 77 in the form of a flash lamp such as Xenon. Laser rod 63 is constructed and positioned similar to laser rod 33 in FIG. 5. Mirrors 65 and 75 are similar to mirror 57 in FIG. 8, mirror 69 is similar to mirror 59 in FIG. 6 and aperture plate 69 is similar to aperture plate 47 in FIG. 5.

Figure 10:
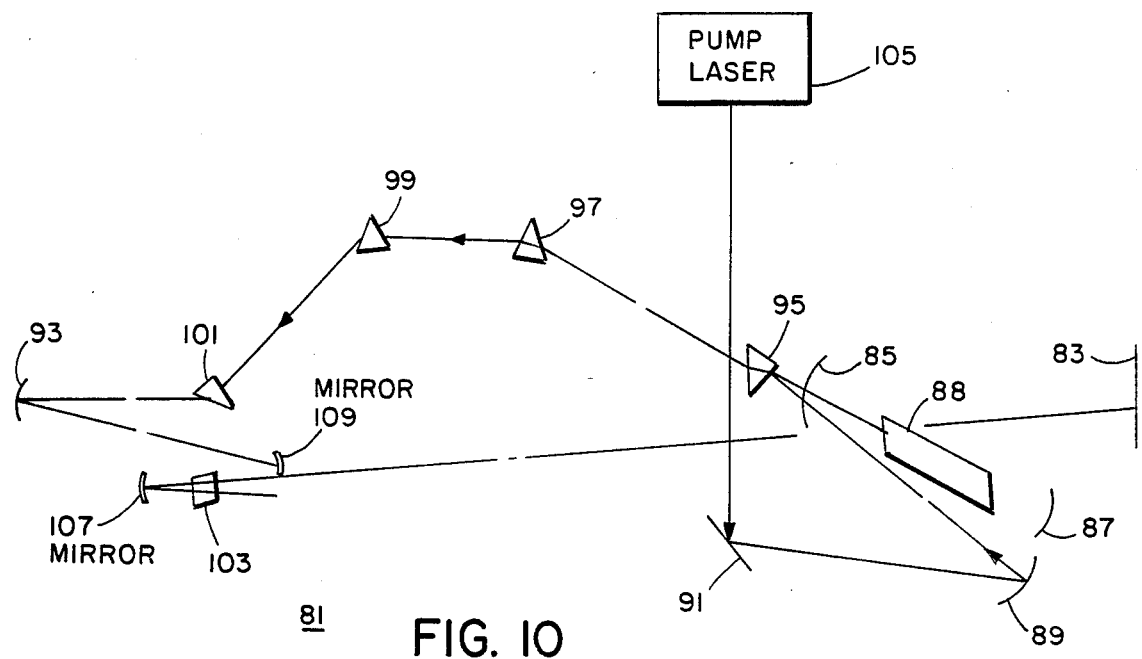
FIG. 10 is a schematic illustration of another laser system constructed according to the present invention.

In FIG. 10 there is shown another laser system 81 according to this invention. System 81 includes a first or output mirror 83, a second mirror 85, a third mirror 87, a chromium doped forsterite crystal laser medium 88 a fourth mirror 89, a fifth mirror 91, a sixth mirror 93, fourth tuning elements 95, 97, 99 and 101, a cell 103 containing a mode locking dye and a pumping laser 105.

Figure 11:
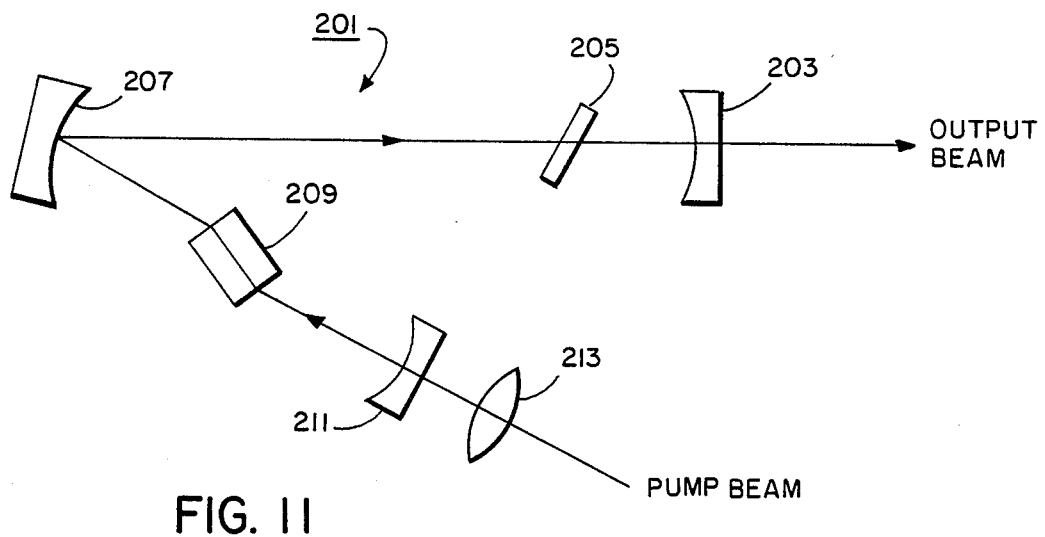
FIG. 11 is a schematic illustration of another laser system constructed according to the present invention.

In FIG. 11 there is shown an astigmatism corrected cavity system 201 according to this invention. System 201 includes a curved output mirror 203, a tuning element 205, a curved collimating mirror 207, a chromium doped forsterite laser rod 209, a curved back mirror 211 and a focusing lens 213.

Instead of trivalent chromium ions, the chromium ions may be divalent ($Cr^{2+}$) or tetravalent ($Cr^{4+}$).

In other embodiments of the invention the pump source is either the fundamental radiation from a Nd:YAG laser (at 1064 nm), Nd:glass lasers (at 1054, and 1060 nm), a Cr, Nd:GSGG laser (at 1061 nm), infrared semiconductor lasers, laser arrays; or any flash lamp or pump source that may excite the 850-1200 nm absorption band.

It should be noted that the single crystal of the laser medium may be crystallographically oriented along either its a, b or c axis, Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A laser comprising:
   a. a laser medium comprising a single crystal of forsterite doped with tetravalent chromium ions and having a formula $CR^{+4}:Mg_2SiO_4$.
   b. optical means for exciting said laser medium to emit coherent optical radiation, and
   c. an optical resonant cavity for supporting coherent radiation emitted by the laser medium over a band between 1150, 850 and 1350 nanometers.

2. The laser of claim 1 wherein the laser is excited by a synchronously pumped modelocked laser to generate ultrashort pulses.

3. The laser of claim 1 wherein the exciting means is selected from the group consisting of: Nd:YAG laser, a Nd:glass laser, a Cr, Nd:GSGG laser, a semiconductor laser and a flash lamp designed to excite the 1150-1350 nm absorption band of the laser medium.

4. A laser comprising:
   a. a laser medium comprising a single crystal of forsterite doped with tetravalent chromium ions, said chromium doping concentration being within the range of about 0.01 and 0.5 atom percent.
   b. means for exciting the laser medium to emit coherent radiation, and
   c. an optical resonant cavity for supporting coherent radiation emitted by the laser medium over a band between 1150 and 1350 nanometers.

5. The laser of claim 4 and wherein the single crystal of the laser medium has an a-axis, a b-axis and a c-axis and wherein the single crystal is crystographically oriented along its b axis.

6. The laser of claim 5 further including mode locking means for mode locking the laser.

7. The laser of claim 6 wherein said mode locking means comprises a saturable absorber disposed within the optical resonant cavity.

8. The laser of claim 7 wherein said saturable absorber is a cyanine dye.

9. The laser of claim 5 further including tuning means for tuning said coherent radiation emitted by said laser medium.

10. The laser of claim 9 wherein the tuning means is a Brewster prism located within the optical resonant cavity.

11. The laser of claim 5 wherein the optical resonant cavity comprises mirrors designed for maximum reflectivity over a broadband between around 1150 nm to 1350 nm.

12. The laser of claim 5 wherein the laser medium comprises an elongated rod of $Cr^{+4}:Mg_2SiO_4Cr:Mg_2SiO_4$ and the optical resonant cavity comprises a pair of mirrors, one of said mirrors being designed for 100% reflectivity in the range of about 1150 nm to 1350 nm and the other mirror being designed for about 50% to 80% reflectivity in the range of about 1150 nm to 1350 nm.

13. The laser of claim 12 further including an aperture plate located within said optical resonant cavity.

14. The laser of claim 12 further including mode locking means disposed within said optical resonant cavity.

15. The laser of claim 12 wherein the ends of said rod are cut at Brewster's angle.

16. The laser of claim 12 wherein said optical resonant cavity comprises a plurality of mirrors arranged in a ring-type configuration with an etalon for tuning.

17. The laser of claim 5 wherein the laser medium is in the form of a thin disc or platelet, the optical resonant cavity comprises a plurality of mirrors arranged in a ringed configuration, the exciting means is a pumping laser and the laser includes mode locking means and tuning means within the cavity, the disc being cut at Brewster's angle.

18. The laser of claim 5 further including a Q-switch selected from the group consisting of: an acousto-optic modulator and a saturable absorber for providing Q-switched operation so as to produce high power nanosecond pulses.

19. The laser of claim 16 where the saturable absorber is dye S401 with absorption peak at 1250 nm.

20. The laser of claim 5 wherein the means for exciting the medium is selected from the group consisting of: a pulsed Nd: YAG laser, a semiconductor-diode laser array, a pulsed nitrogen laser, a dye laser, an argon-ion laser, a Krypton-ion laser, a CW Nd:YAG laser and a flash lamp.

21. The laser of claim 5 wherein the laser cavity comprises two concave mirrors 0.3 meter in radius separated by a distance of 20 cm.

22. The laser of claim 21 wherein the concave mirrors are coated for high reflectivity in the 1150–1350 nm range and high transmission at the pump wavelength.

23. The laser of claim 22 wherein the laser cavity is constructed for operation with a pump wavelength of 532 nm obtained from a YAG laser.

24. The laser of claim 22 and wherein the cavity is constructed for operation with pump wavelengths of 488 and 5145 nm obtained from an argon-ion laser.

25. The laser of claim 22 wherein the cavity is constructed for operation with a pump wavelength of 353 nm obtained from a nitrogen laser.

26. The laser of claim 5 wherein the laser crystal is antireflection coated for a wavelength range of 1150–1350 nm.

27. The laser cavity of claim 5 further including a tuning means selected from the group consisting of comprising either a birefringent filter a birefringent plate and an etalon.

28. The laser of claim 2 and wherein the single crystal of laser medium has an a-axis, a b-axis and a c-axis and wherein the single crystal is crystallographically oriented along the c-axis.

29. The laser of claim 4 wherein the single crystal off laser medium has an a-axis, a b-axis and a c-axis and wherein the single crystal is crystallographically oriented along the a-axis.

30. The laser of claim 4 wherein the single crystal of forsterite is cooled by means selected from the group consisting of air, gas, water, a cryogenic fluid and thermoelectric means in order to stabilize its operating temperature and optimize its output.

31. A laser system comprising a laser crystal of divalent vanadium-doped forsterite ($V^{2+}:Mg_2SiO_4$).

32. A laser comprising: a folded astigmatic corrected cavity having three mirrors, a tetravalent forsterite crystal having a formula $Cr^{+4}:Mg_2SiO_4$ and placed in the cavity, a tuning means, a focusing lens and means for pumping said $Cr^{+4}:Mg_2SiO_4$ crystal.

* * * * *